United States Patent [19]
Crawshaw et al.

[11] Patent Number: 5,775,652
[45] Date of Patent: Jul. 7, 1998

[54] THEATRICAL LIGHTING CLAMP

[75] Inventors: Alan W. Crawshaw, Seattle; Paul J. Katocs, Fall City; Nicholas J. Watts, Renton, all of Wash.

[73] Assignee: A.C.T. Enterprises, Inc., Seattle, Wash.

[21] Appl. No.: 559,545

[22] Filed: Nov. 16, 1995

[51] Int. Cl.$^6$ .................................................. E04G 3/00
[52] U.S. Cl. ........................................ 248/230.6; 33/783
[58] Field of Search ...................... 248/230.6, 229.25, 248/229.15, 228.6, 231.71, 217; 33/783, 814, 831, 816; 269/749, 99; 362/396, 404; 411/178, 245, 244; 403/342, 3, DIG. 9, 343

[56] References Cited

U.S. PATENT DOCUMENTS

| | | | |
|---|---|---|---|
| 1,745,929 | 4/1930 | Atticks et al. | 248/230 |
| 2,461,995 | 2/1949 | Modes | 53/814 |
| 2,543,540 | 2/1951 | Anderson | 173/259 |

(List continued on next page.)

OTHER PUBLICATIONS

Photocopy of clamp manufactured by Manfrotto, Italy, purchased Jan. 1996. Clamp includes clamp body (A), threaded adjustment bolt (B), and spring–loaded release button (C) which when depressed allows bolt (B) to slide freely.

Pacific Northwest Theatre Associates, Inc., "PNTA Stage & Studio Supplies, DOGALOG 1995–96," Lighting Hardware.

"GRAINGER® Industrial and Commercial Equipment and Supplies, 1995 General Catalog No. 386," (1995).

Carr Lane Manjfacturing Co., "Component Parts of Jigs and Fixtures USA & Metric" (1994).

*Primary Examiner*—Ramon O. Ramirez
*Assistant Examiner*—Willie Berry, Jr.

*Attorney, Agent, or Firm*—Christensen O'Connor Johnson & Kindness PLLC

[57] ABSTRACT

A quick release clamp (10) for mounting equipment such as a lighting instrument (60) on a structural member such as a pipe (36). The clamp includes a C-shaped body (12) having a jaw portion (16), a back portion (14) and a base portion (18), the jaw and base portions extending from the back portion in spaced opposing disposition. The base portion defines an adjustment aperture (22) that is formed with an internal interrupted thread (24). An elongate tubular coarse adjustment sleeve (26) defines an internal threaded central passage (28) and an external interrupted thread (30) corresponding to the internal interrupted thread of the body. The sleeve is receivable within the adjustment aperture of the body and rotatable about a longitudinal axis of the sleeve into a first position, in which the sleeve is freely movable longitudinally within the adjustment aperture, and a second position, in which the external interrupted thread of the sleeve engages and locks within the internal interrupted thread of the body to prevent longitudinal movement of the sleeve. An elongate fine adjustment bolt (34) is coaxially and threadably received within the sleeve, and is rotatable within the sleeve to project a selected amount through the sleeve towards the jaw and back portions of the body. The base portion of the body also defines a mounting passage (38) which receives the neck (42) of a mounting spigot (40) secured therein. The mounting spigot defines an elongate T-slot (52). A T-stem (58) has a T-shaped head (62) that is slidably insertable into the T-slot of the spigot through an open first end (54) of the T-slot. The head of the T-stem is selectively secured within the T-slot of the spigot by a spring-loaded latch (66) and nut (68) carried on the stem of the T-stem. The lighting instrument is secured to the stem (64) of the T-stem, and may be rapidly connected and detached from the clamps.

32 Claims, 7 Drawing Sheets

U.S. PATENT DOCUMENTS

| | | | |
|---|---|---|---|
| 3,425,127 | 2/1969 | Long et al. | 33/86 |
| 3,706,437 | 12/1972 | Eberhardt | 248/230 |
| 3,784,140 | 1/1974 | Auerbach | 248/214 |
| 3,902,931 | 9/1975 | Danciger et al. | 248/230 |
| 3,949,880 | 4/1976 | Fortunato | 211/86 |
| 4,142,703 | 3/1979 | Moretto | 248/214 |
| 4,643,460 | 2/1987 | Lieberg | 285/112 |
| 4,702,448 | 10/1987 | LoJacono et al. | 248/231.7 |
| 4,828,210 | 5/1989 | Anderson et al. | 248/229 |
| 4,832,299 | 5/1989 | Gorton et al. | 248/231.7 |
| 4,852,840 | 8/1989 | Marks | 248/230 |
| 4,991,249 | 2/1991 | Suroff | 15/22.2 |
| 5,088,853 | 2/1992 | Reid | 403/330 |
| 5,161,764 | 11/1992 | Roney | 248/231.7 |
| 5,190,257 | 3/1993 | Gradei et al. | 248/231.7 |
| 5,312,079 | 5/1994 | Little, Jr. | 248/230 |

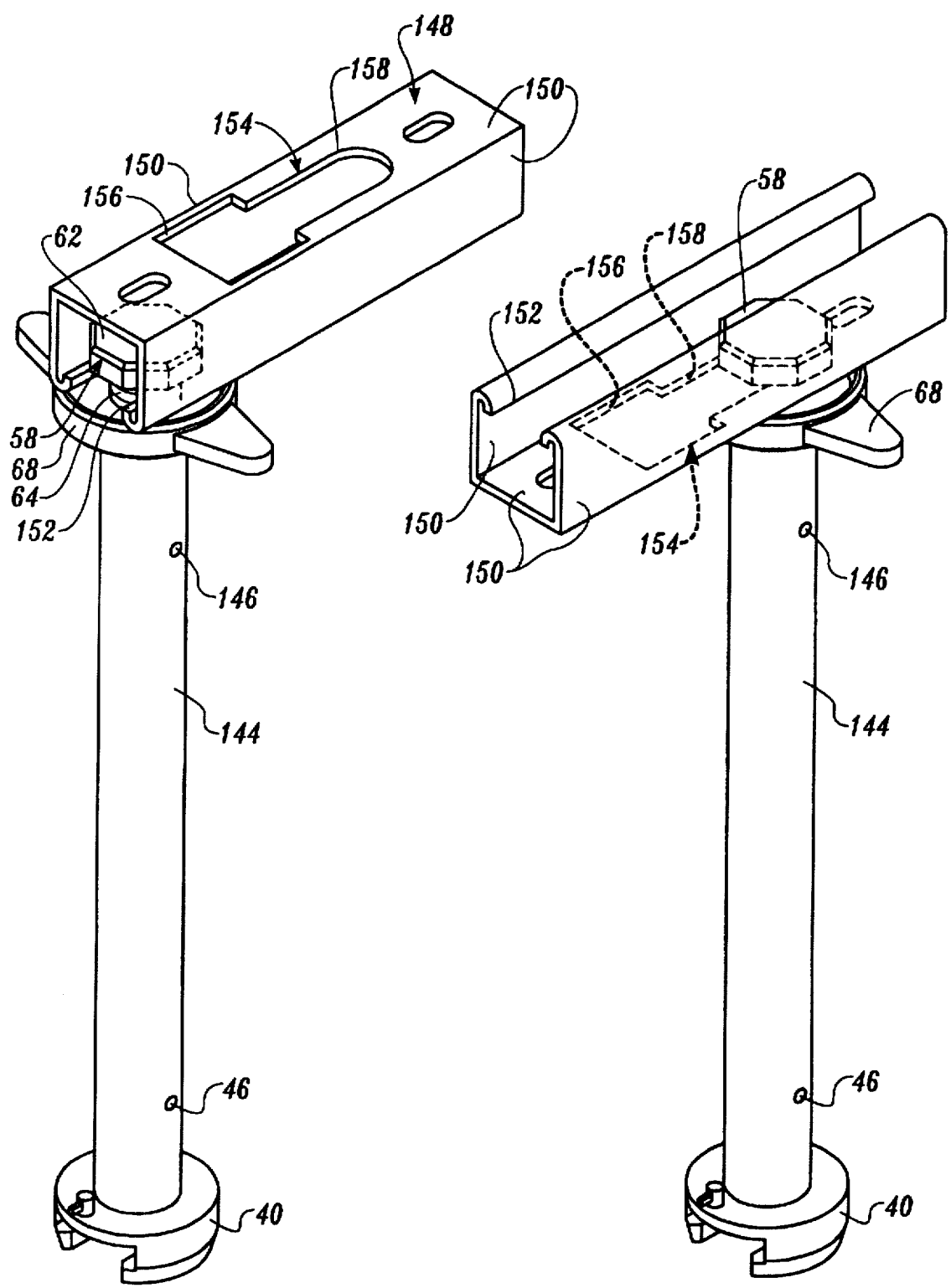

THEATRICAL LIGHTING CLAMP

TECHNICAL FIELD OF THE INVENTION

The present invention relates to clamps for mounting equipment onto structural members, and particularly to clamps for mounting lighting instruments onto pipes and scaffolding.

BACKGROUND OF THE INVENTION

The entertainment, theater and convention business requires repeated set up and tear down of lighting instruments in various configurations. Lighting instruments are typically supported on horizontal pipe battens, vertical boom pipes, scaffolding or other elongate structural members. The lighting instrument includes a yolk which is bolted to a clamp. The clamp, which is most commonly a C-clamp, is then clamped onto the structural member by tightening an adjustment bolt provided on the clamp. Lighting instruments are usually remounted to different support structures between various theatrical productions to obtain the preferred lighting of the scene. Each clamp typically remains secured to its lighting instrument, so that a light can be removed from one fixed location and set at a new location by releasing the clamp from one support structure and reafixing the clamp to a different support structure or to a different position along the same support structure. Conventionally, side arms, hardware structures composed of a C-clamp, a tubular member and a sliding "T" that can be placed along the tubular member, may be added between the lighting instrument and the clamp when necessary to have the lighting instrument offset horizontally from the structural member for proper focus. In some cases, lighting instruments need to be mounted on formed tracks rather than pipes, requiring the use of alternate clamping arrangements.

When unclamping a lighting instrument from a structural member, it is necessary to back out the adjustment bolt sufficiently to allow disengagement from the structural member. For reinstallation of the clamp, the adjustment bolt must then be rethreaded inwardly for fastening to another structural member, which may have a different diameter than the prior structural member with which the clamp was used necessitating more time for reinstallation. The backing out and rethreading of the adjustment bolt is labor intensive and time consuming. Often in attempts to make such adjustments and to ensure a firm grip of the clamp on the structural member, adjustment bolts may be over-torqued by a technician bending the adjustment bolt. This either ends the useful life of the clamp or poses a potential structural weakness. A further problem of conventional clamps is that the body is most often formed from cast iron, which may crack after repeated overstressing.

An example of a conventional C-clamp used for mounting lighting instrument is disclosed in U.S. Pat. No. 1,754,929 to Atticks. This type of clamp is commercially available from Altman Corporation. Conventional clamps include an aperture formed in the base of the clamp into which a spigot is inserted for mounting the lighting instrument to the clamp. The spigot has an enlarged diameter head that will not pass through the aperture and a stem projecting from the aperture. The spigot is antirotatably secured within the aperture by tightening a radial set bolt carried in the base of the clamp against the stem of the spigot. The yolk of the lighting instrument is bolted to the projecting end of the spigot by threading a bolt into the end of the spigot. To change the lighting instrument to another mounting means, it is necessary to back out the bolt and attach another mounting means to the yoke by this same bolt. Again, this adjustment is time consuming and labor intensive.

One conventional attempt to provide a clamp that may be more rapidly clamped and unclamped on structural members is disclosed in U.S. Pat. No. 3,784,140 to Auerbach. This clamp is sold commercially under the trademark SURECLAMP™. The clamp includes a pivoting clamping jaw which is actuated by turning a threaded knurl knob to loosen a locking mechanism, which enables the rod to be moved longitudinally to pivot the clamp open and closed. While this clamp does provide for quicker adjustment, design factors of the SURECLAMP limit its use to light-weight fixtures and the fixture position is limited to being directly beneath the horizontal structural support.

An additional limitation of conventional clamps is the lack of a provision to attach a lift line to the clamp to pull the lighting instrument to a distant location which may be at a high elevation. Conventionally this is done by tying a line to the instrument or clamp, which is again time consuming. Additionally, once the clamp is secured in place by tightening the adjustment bolt against the structural support it is sometimes desirable to secure a safety cable between the pipe and instrument. Conventionally this is done by threading the safety cable through the yolk of the instrument and around the pipe or structural support, followed by tying or clipping the safety cable. Again, affixing safety cable is time consuming.

SUMMARY OF THE INVENTION

The present invention provides a quick release clamp for mounting equipment on a structural member. The clamp includes a C-shaped body having a jaw portion, a back portion, and a base portion. The jaw and base portions extend from the back portion in spaced opposing disposition. The base portion defines an adjustment aperture formed with an internal engagement surface. An elongate tubular sleeve is included and defines an internal threaded passage and an external engagement surface corresponding to the internal engagement surface of the body. In a preferred embodiment of the invention, the internal engagement surface of the adjustment aperture of the body and the external engagement surface of the tubular sleeve are provided with corresponding interrupted threads. The sleeve is receivable within the adjustment aperture of the body and is rotatable about a longitudinal axis of the sleeve between a first position, in which the sleeve is freely movable longitudinally within the adjustment aperture, and a second position, in which the external engagement surface of the sleeve engages and locks against the internal engagement surface of the body to prevent longitudinal movement of the sleeve. In the preferred embodiment, the interrupted threads of the body and sleeve do not engage when in the first position, but engage and interlock when in the second position. The clamp further includes an elongate bolt that is coaxially threaded within the sleeve and is rotatably advanceable within the sleeve to extend a selected amount through the sleeve towards the jaw and back portions of the body of the clamp. The body includes a mount for securing the body to the equipment that is to be clamped on the structural member.

The bolt assembly formed from the sleeve and bolt provides for quick adjustment of the clamp. When the clamp is to be installed, the sleeve is slid forwardly to approximately the desired location, with the end of the bolt abutting the pipe or other structural member. The sleeve is then turned to lock it into this selected longitudinal position, completing the "coarse" adjustment of the bolt. The internal bolt is then threaded forwardly until it bears tightly against the structural member to complete the "fine" adjustment of the bolt to securely capture the structural member between the body of the clamp and the bolt. The opposite procedure is used to loosen the bolt, making for a very rapid clamping and unclamping of the clamp on the structural member. The surrounding of the adjustment bolt by the coaxial sleeve serves to strengthen and reinforce the bolt to prevent bending or breakage of the bolt. This extends the life of the clamp. In addition, in the preferred embodiment the clamp is formed from a high-carbon steel rather than cast iron, further strengthening and extending the life of the clamp.

In the preferred embodiment, the clamp includes a second aperture through which a mount is installed for attachment to the equipment to be mounted by the clamp, such as the yolk of a lighting instrument. In the preferred embodiment, the mount comprises a spigot having an elongate neck and an enlarged diameter head. The neck is inserted through the mounting aperture of the clamp from the outside of the clamp, and is retained in place by a bayonet pin inserted transversely through the distal end of the neck. A set bolt is threaded radially through the body of the clamp to bear against the neck to prevent rotation of the neck. The head of the spigot includes an elongate slot having a T-shaped cross section, an open first end and a closed second end. To mount equipment to the spigot, a T-stem is provided which is fastened to the yoke of the lighting instrument. The T-stem includes a head that is slid into and retained within the slot of the spigot through the open first end of the slot. A nut is threaded on the exterior of the T-stem until it engages and receives the head of the spigot to prevent withdrawal of the T-stem from the T-slot. The lighting instrument other equipment may be rapidly removed by loosening the nut and withdrawing the T-stem from the T-slot. The lighting instrument may then be reinstalled on another clamp or mounting device including a T-slot. Likewise, a different lighting instrument or other equipment including a T-stem can be quickly installed on the clamp. The spigot and set bolt of the clamp need not be readjusted or removed for these changes.

The present invention thus provides a clamp which can be rapidly and efficiently clamped and unclamped. Lighting instruments can be rapidly attached to and detached from the clamp through the use of the T-slot and T-stem.

In a further aspect of the invention, an aperture is provided in the body of the clamp for attachment of a carabiner or a safety cable to the clamp. Thus a safety cable may be rapidly and securely looped through the instrument yoke and connected to the clamp as a fail safe and a carabiner may be rapidly and safely attached for lifting of the lighting instrument and clamp during installation.

BRIEF DESCRIPTION OF THE DRAWINGS

The foregoing aspects and many of the attendant advantages of this invention will become better understood by reference to the following detailed description, when taken in conjunction with the accompanying drawings, wherein:

FIG. 8 is an isometric view of the vertical extension rod and T-stem of FIG. 7 of the present invention shown secured within the open side of a formed track;

FIG. 9 is a pictorial view of the T-stem and vertical extension rod of FIG. 8 shown secured within a slot provided in the closed side of the formed track.

DETAILED DESCRIPTION OF THE PREFERRED EMBODIMENT

Figure 1:
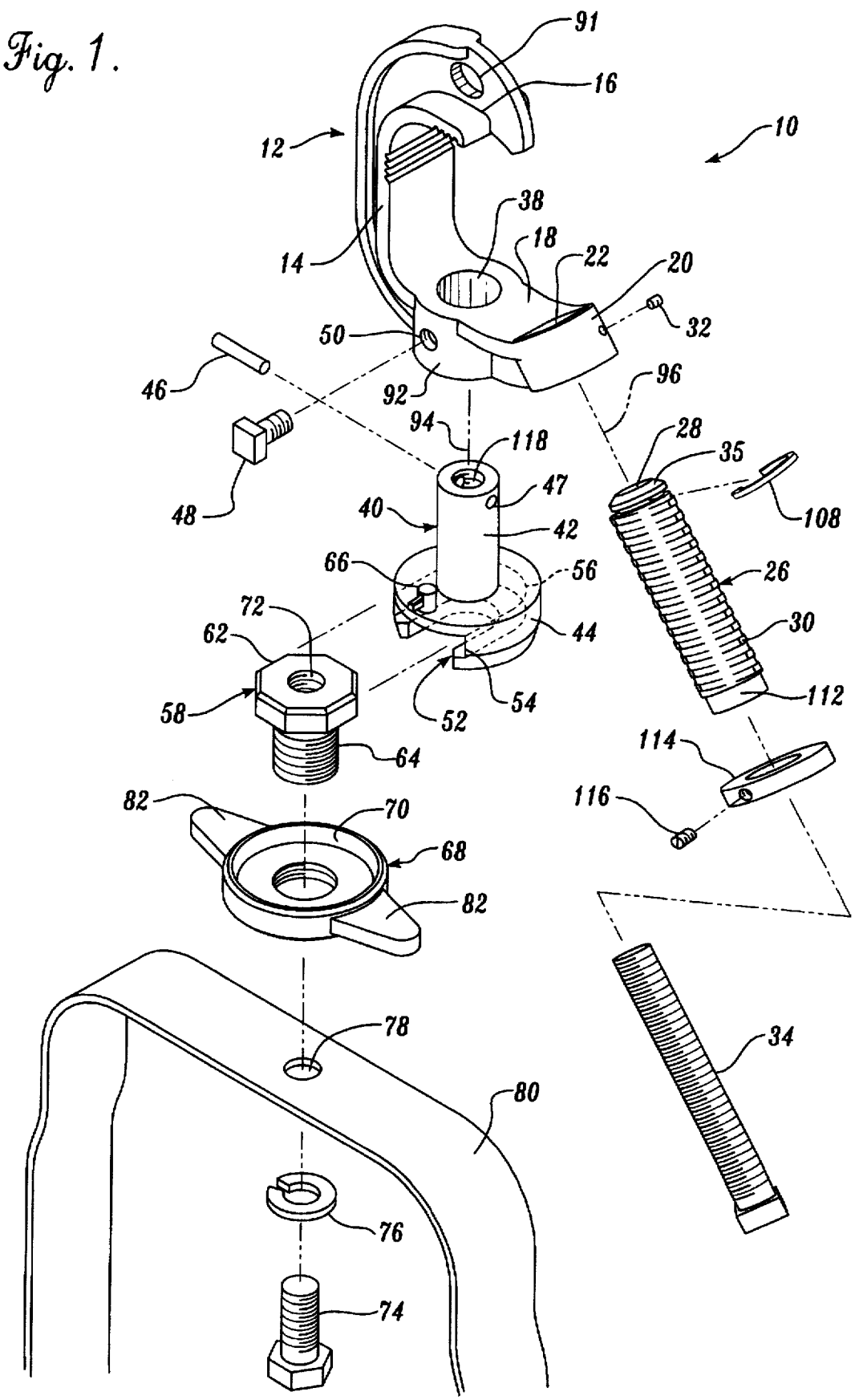
FIG. 1 provides an exploded isometric view of a preferred embodiment of the clamp of the preset invention and the yolk of an instrument to be attached to the clamp.
Figure 2:
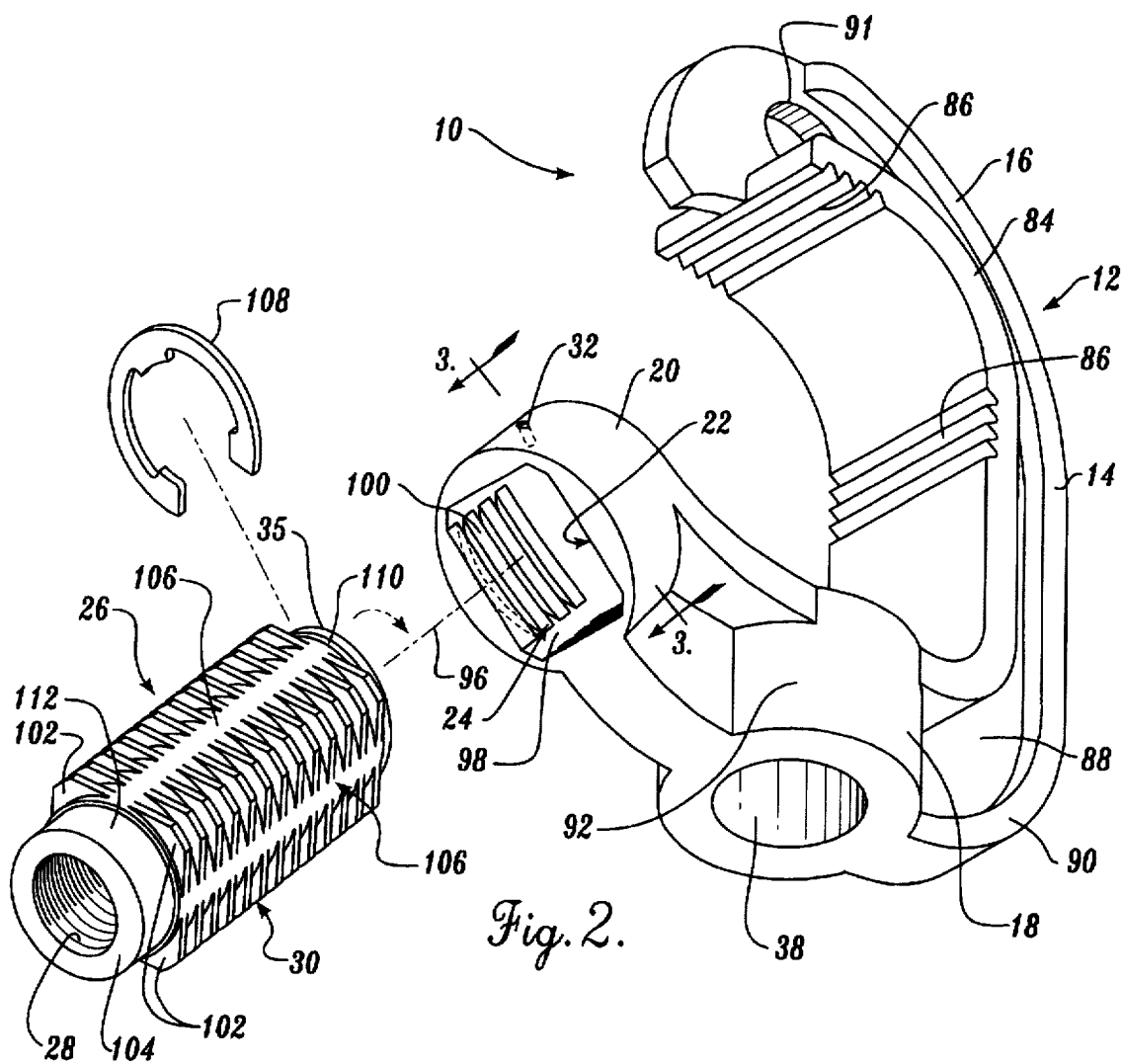
FIG. 2 provides an exploded perspective view of the clamp and coarse adjustment sleeve of FIG. 1 showing details of the interrupted thread.

The preferred embodiment of a clamp 10 constructed in accordance with the present invention is shown in FIGS. 1 through 4. Clamp 10 includes a C-shaped body 12 including a central back portion 14 and a jaw portion 16 and base portion 18 that project in spaced opposing disposition from the ends of the back portion 14. The base portion 18 includes an adjustment end 20 in which is formed an adjustment aperture 22. As shown in FIG. 2, the interior of the adjustment aperture 22 defines an interrupted thread 24.

The clamp 10 further includes a coarse adjustment sleeve 26 having an internally threaded central passage 28 (FIG. 2) and an external surface that defines an interrupted thread 30 corresponding to the internal interrupted thread 24 of the body 12. When the interrupted threads 24 and 30 are aligned, the sleeve 26 can be inserted freely longitudinally into the adjustment aperture 22. The sleeve 26 can then be rotated until the thread 30 contact a stop set screw 32, as shall be described subsequently, to lock the sleeve in place and prevent further longitudinal and rotational movement of the sleeve 26 relative to the body 12.

The clamp 10 further includes an elongate externally threaded fine adjustment bolt 34 (FIG. 1) that is threadably inserted into the central passage 28 of the sleeve 26. The adjustment bolt 34 is longer than the sleeve 26, so that it can be positioned to project a selected distance beyond the distal end 35 of the sleeve 26. The bolt 34 provides for the fine adjustment of a clamping force imposed on a structural member such as the pipe 36 indicated in FIG. 4. The pipe 36 is thus clamped securely between the distal end 35 of the bolt 34 and the jaw portion 16 and back portion 14 of the body 12.

The base portion 18 of the body 12 also includes a mounting passage 38 (FIG. 1) into which a mounting spigot 40 is inserted. The spigot 40 includes a cylindrical neck 42 and a larger diameter cylindrical base 44. The neck 42 is inserted through the mounting passage 38 of the base portion 18 from the outside of the clamp. The neck 42 is closely matched in size to the mounting passage 38, while the base 44 is sufficiently large that it will not enter the mounting passage 38. After insertion through the mounting passage 38, a bayonet pin 46 is inserted transversely through radial passage 47 formed radially across the distal tip of the neck 42. The bayonet pin 46 is wider than the diameter of mounting passage 38, and thus prevents the spigot 40 from being removed from the mounting passage 38. A set bolt 48 is threaded into a passage 50 formed radially through the base portion 18 of the body 12 and is tightened against the neck 42 of the spigot 40 to antirotatably secure the spigot 40 relative to the body 12.

The base 44 of the spigot 40 defines an elongate, radially oriented T-slot 52 having an open end 54 that opens onto the outer perimeter of the base 44 and an interior closed end 56. The interior walls of the T-slot 52 defines a "T" profile.

Figure 4:
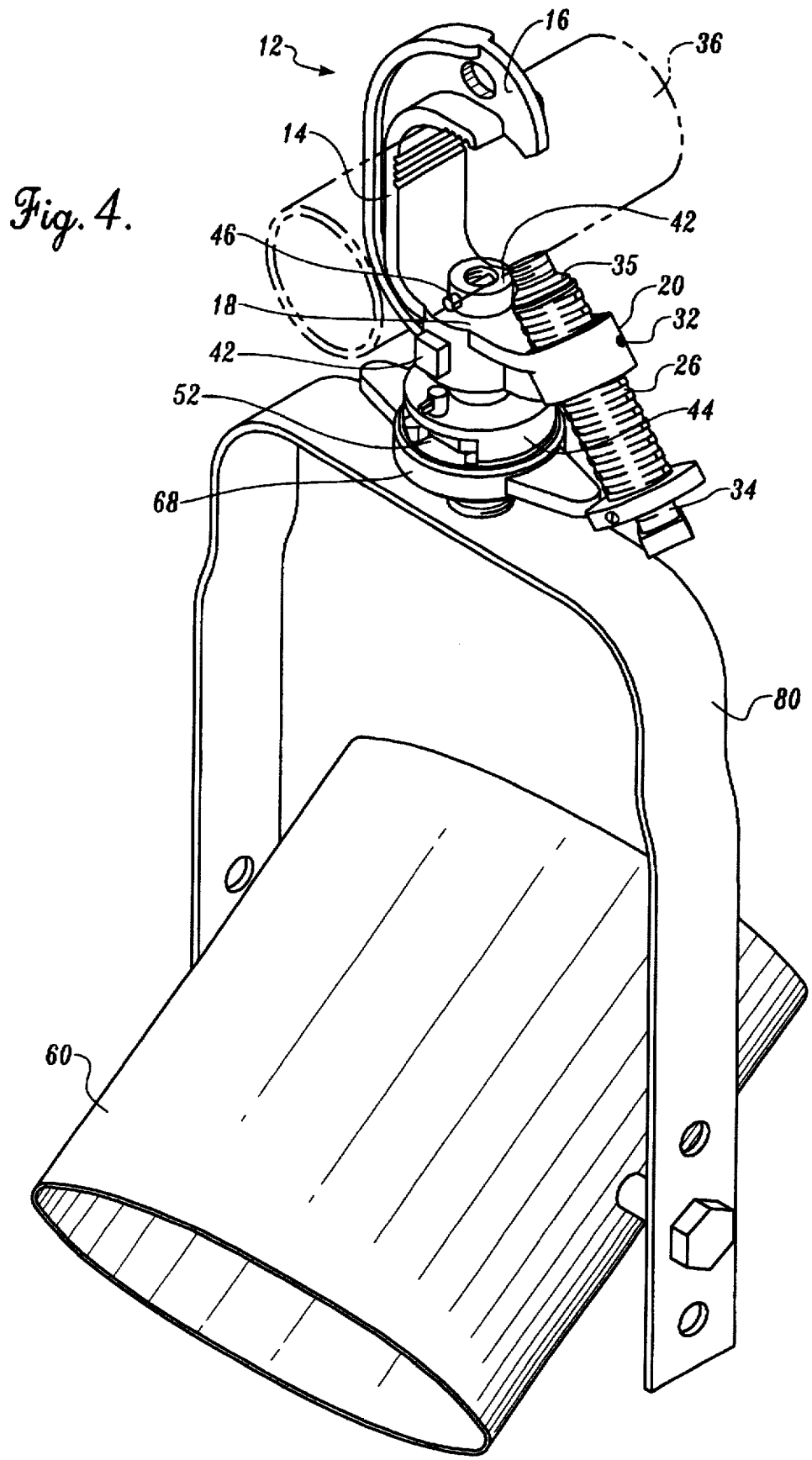
FIG. 4 provides a pictorial view of the clamp of the present invention in use mounting a lighting instrument on a pipe which is shown in phantom.

The clamp 10 further includes a T-stem 58 that engages with the T-slot 52 for the purpose of mounting a lighting instrument, such as the lighting instrument 60 shown in FIG. 4, or other equipment to the clamp 10. The T-stem 58 includes an octagonally shaped head 62 and an externally threaded stem 64. The head 62 of the T-stem 58 is slidably inserted into the T-slot 52 through the open end 54 of the T-slot 52. It is retained in place by a spring loaded latch 66 mounted on the base 44 of the spigot 40. To further securely retain the T-stem 58 within the spigot 40, a nut 68 is threaded onto the stem 64 of the T-stem 58. The nut has an annular collet flange 70 that surrounds and receives a proximal end portion of the base 44 of the spigot 40. When so secured, the nut prevents removal of the T-stem 58 from the T-slot 52. The T-stem 58 further includes an internally threaded central passage 72. A mounting bolt 74 is inserted through a lock washer 76 and an aperture 78 formed in the yolk 80 of the lighting instrument 60 or other equipment to be mounted, and is threaded into the central passage 72 of the T-stem 58. The yolk 80 is bolted at either end to the lighting instrument 60. In this fashion the lighting instrument 60 or other equipment that is secured to the T-stem 58 may be quickly and securely connected to the clamp 10 by sliding the head 62 of the T-stem 58 into the T-slot 52 of the spigot 40 and then threading the nut 68, which is conveniently provided with wings 82 upward to receive the proximal end portion of the base 44 of the spigot 40. Removal of the lighting instrument 60 or other equipment likewise requires only loosening of the nut 68, release of the spring loaded latch 66 and withdrawal of the T-stem 58 from the T-slot 52 of the spigot 40.

The detailed construction of each component of the assembled clamp 10 will now be described in greater detail. In so doing, the terms "bottom" and "downward" are used to refer to the direction of the base portion 18 of the body 12 of the clamp 10, while the terms "upper" and "upward" are used to refer to the direction of the opposing jaw portion 16 of the body 12 of the clamp 10. However it should be understood that the clamp 10 can be used in any orientation, whether it be vertical, upside down, horizontal or otherwise. Likewise, while the clamp 10 is described for use in mounting a lighting instrument 60, it should be understood that various other lighting instruments or other pieces of equipment may be suitably mounted using the clamp 10. Clamp 10 is also described and illustrated attached to a cylindrical pipe 36 (FIGS. 4 and 7), but it should be readily apparent that the clamp 10 is also well suited for attachment to other elongate structural members, such as rectangular tubing, scaffolding and the like.

The clamp body 12 is preferably formed from steel, which may be cast, forged, machined or otherwise worked. Referring to FIG. 2, the body 12 of the clamp 10 has an interior C-shaped flange 84. The flange 84 thus has a vertical center portion corresponding to the back portion 14 of the body and opposing end portions oriented perpendicularly to the center portion that correspond to the jaw portion 16 and base portion 18 of the body. The flange 84 is radiused at the junctures of the end portions and the center portion. The flange 84 defines two sets of transverse serrations 86 on the end portion (corresponding to the jaw portion 16 of the body) and the center portion (corresponding to the back portion 14 of the body), which aid in gripping the pipe 36 or other structural member. The flange 84 is reinforced by a C-shaped strongback 88, which is integrally formed with the flange 84 and wraps around the exterior of the flange. A second transverse flange 90, also integrally formed as part of the body, wraps the exterior of the strongback 88.

An oval caribiner aperture 91 is formed transversely through the strongback 88 in the jaw portion 16 of the body 12. The aperture 91 accommodates a caribiner for lifting the clamp or a safety line or cable.

The base portion 18 of the body includes a cylindrical boss 92 that defines the mounting passage 38. The mounting passage 38 and boss 92 are aligned on the longitudinal axis 94 (FIG. 1) of the mounting passage 38. The longitudinal axis 94 is oriented orthogonally relative to the end portion of the flange 84 that corresponds to the base portion 18 of the body. The base portion 18 includes a second cylindrical portion which forms the adjustment end 20 of the base portion 18. The cylindrical adjustment end 20 includes the adjustment aperture 22, and is oriented on the longitudinal axis 96 (FIG. 1) of the adjustment aperture 22. The adjustment end 20 and adjustment aperture 22 are angled relative to the base portion 18 such that the longitudinal axis 96 is pointed towards the juncture of the jaw portion 16 and back portion 14 of the body. Thus the adjustment sleeve 26 and adjustment bolt 34, when mounted in the adjustment aperture 22, likewise angle towards the juncture of the jaw portion 16 and back portion 14 of the body on the axis 96.

Figure 3:
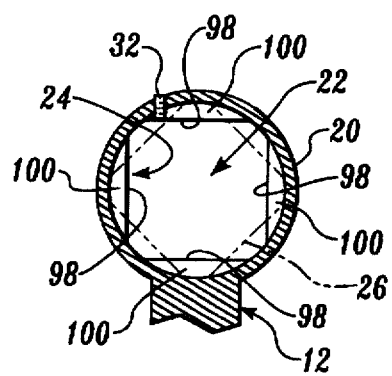
FIG. 3 is a cross-sectional view of the interrupted threaded aperture of the clamp of FIG. 1, taken substantially along line 3—3 as shown in FIG. 2, and including the profile of the coarse adjustment sleeve shown in phantom in a locked position.

Referring next to FIG. 2, the adjustment aperture 22 of the body has a substantially square internal cross sectional profile, with each corner of the square profile beveled off. A left handed spiral thread, suitably formed as an Acme thread, is formed in the interior wall of the adjustment aperture 22 about the longitudinal axis 96. Because the profile of the adjustment aperture is square rather than round, segments of the thread are missing at each of the corners of the adjustment aperture 22. Thus each interior sidewall 98 of the adjustment aperture 22 includes a longitudinally spaced series of left handed spiral thread segments 100, defined by the minor axis of the internal thread. Collectively these thread segments 100 on each of the four internal side walls 98 of the adjustment aperture 22 define the interrupted thread 24. Thus, the thread is "interrupted," or broken, at each of the four corners of the adjustment aperture 22, as can also be seen in the cross sectional view of FIG. 3. The view of FIG. 3 is taken on a cross section oriented orthogonally relative to the longitudinal axis 96 and viewed from the interior towards the exterior of the clamp. The stop set screw 32 is threaded through the wall of the adjustment end 20 of the base portion 18 to project into the interior of the adjustment aperture 22 between the crests of two adjacent thread segments 100, i.e., on the major diameter of the internal interrupted thread 24, as shown in FIG. 3. This stop set screw 32 serves to prevent full rotation of the adjustment sleeve 26 within the adjustment aperture 22, as shall be described subsequently.

Referring to FIGS. 1 and 2, the adjustment sleeve 26 has a corresponding set of interrupted external thread segments 102 formed about its exterior surface, which collectively define the external interrupted thread 30. Thus the adjustment sleeve 26 has a cylindrical wall 104 about which the thread segments 102 project radially to define the left handed spiral interrupted thread 30. When viewed endwise, the thread segments 102 provide a substantially square external profile of the sleeve 26, with each corner of the square being beveled off at the apex of the thread segments 102. The thread segments 102 thus define four longitudinally oriented flat sides 106 of the sleeve 26, a longitudinal center portion of each side being devoid of threads to form the interruptions in the thread segments 102.

When the flat sides 106 of the sleeve 26 are aligned with the internal sidewalls 98 of the adjustment aperture 22, the sleeve may be slidably advanced and retracted along longitudinal axis 96 through the adjustment aperture 22. When oriented at the desired location, the sleeve 26 is twisted to lock into position. Because technicians will assume that the sleeve 26 has conventional right handed thread, they will twist the sleeve 26 clockwise, i.e., in the right handed direction, so that the thread segments 102 of the external interrupted thread 30 of the sleeve intermesh and engage with the thread segments 100 of the internal interrupted thread 24 of the adjustment aperture 22. This twisting rotation in a clockwise direction can be accomplished until the crest of one of the thread segments 102 abuts the stop set screw 32 of the body 12 of the clamp, at which point further clockwise rotation is limited. This locked position is illustrated in FIG. 3, with the profile of the external interrupted thread 30 of the sleeve 26 being shown in phantom in the locked position. Again, this locked position is achieved by twisting the sleeve 26 clockwise (counterclockwise as viewed in FIG. 3). If a technician attempted to twist the sleeve 26 counterclockwise (as viewed in FIG. 2), in realization that it is a left handed threaded, the stop set screw 32 would prevent rotation of the sleeve 26 and engagement of the thread segments 100 and 102.

To prevent accidental withdrawal of the sleeve 26 fully from the adjustment aperture 22, a spring clip 108 is inserted into an annular groove formed about the exterior of the distal end 35 of the sleeve 26. The spring clip 108 is larger than the adjustment aperture 22, thus safely preventing the sleeve 26 from dropping free of the clamp body 12. The opposite, proximal end 112 of the sleeve 26 is devoid of thread, and coaxially receives an annular collar 114 that is secured in place by a set screw 116 FIG. 1). The collar 114 is preferably knurled about its outer surface and is graspable for manual rotation of the sleeve 26.

The fine adjustment bolt 34 is threaded through the central passage 28 of the sleeve 26, and is typically maintained such that it projects a selected amount past the distal end 35 of the sleeve 26. This is possible because the adjustment bolt 34 is longer than the sleeve 26. Because the bolt 34 is surrounded and supported about the center portion of its length by the sleeve 26, it is protected from being inadvertently bent during normal operation.

To secure a pipe 36 or other structural member within the clamp 10, the pipe is inserted within the interior of the body 12 and pushed against the jaw portion 16 and back portion 14. The sleeve 26 is then slid inwardly until it contacts or approaches the pipe 36, and is then locked into position by turning the sleeve 26 clockwise, which backs the distal tip 35 of the sleeve 26 slightly away from the pipe 36. The adjustment bolt 34, which has a conventional right handed thread, is then threaded inwardly in a clockwise direction until it tightly bears against the pipe 36. This rotation does not serve to disengage the sleeve 26 because rotational forces in a clockwise direction on the sleeve 26 merely serve to keep it in the locked position. Thus only a small amount of adjustment of the bolt 34 is required to securely clamp the pipe 36. To remove the pipe 36, all that is necessary is to relieve tension on the bolt assembly by backing the adjustment bolt 34 out a very short distance through counterclockwise rotation, and then rotating the adjustment sleeve 26 in the counterclockwise direction until the flat sides 106 of the sleeve 26 are aligned with the internal sidewalls 98 of the adjustment aperture 22. This then permits slidable retraction of the assembled sleeve 26 and bolt 34 as a unit.

If, while the pipe 36 is securely clamped by the clamp 10, someone unintentionally were to turn the sleeve 26 clockwise, this would have no impact because the sleeve is already in a clockwise locked position with the interrupted external thread segments 102 against the stop screw 32. If someone inadvertently should try to turn the coarse adjustment sleeve 26 in the counterclockwise position, as would be necessary to unlock the interrupted threads, the left handed spiral of the threads would cause the sleeve 26 to attempt to move forwardly towards the pipe 36, thus merely further tightening the clamp on the pipe 36. Thus the sleeve 26 cannot be rotated counterclockwise to the unlocked position until the adjustment bolt 34 has first been manually loosened one or two turns, ensuring that the clamp is not accidentally loosened.

The use of a left handed spiral interrupted thread on the sleeve 26 is thus highly desirable for the purposes of both allowing quick and low labor clamping and unclamping of the clamp 10, and to prevent accidental unclamping of the clamp 10. It should be apparent to those of ordinary skill in the art that a right handed spiral interrupted thread would also serve to suitably permit rapid clamping and unclamping of the clamp 10 of the present invention. However, a right handed spiral interrupted thread, or a straight (non-spiral) square interrupted thread, which is also feasible, are not the most preferred because of the above noted safety advantages of the left handed spiral. It should also be apparent to those of ordinary skill in the art that other types of engaging surfaces for the exterior of the adjustment sleeve 26 and interior of the adjustment aperture 22 could be adapted within the scope of the present invention, such as: eccentrically shaped engaging surfaces (not shown); the provision of a stop on the sleeve 26 that would engage in a selected one of a series of spiral grooves formed in the interior of the adjustment aperture 22 (not shown); or the converse formation of a series of spiral grooves on the exterior of the adjustment sleeve that engage with a pin carried on the interior of the adjustment aperture (not shown).

Figure 10:
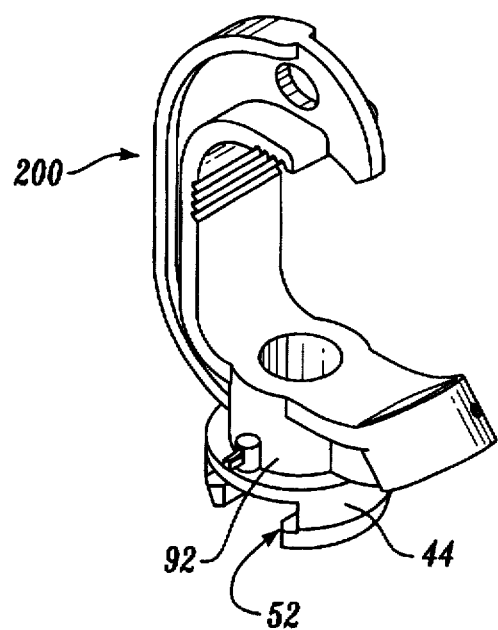
FIG. 10 is a pictorial view of an alternate embodiment of the clamp of FIG. 1 in which the mounting spigot and the clamp body are integrally formed.

Attention is now directed to FIG. 1 for description of the quick release mounting of the instrument 60 or other equipment to the clamp 10. The mounting spigot 40, as previously described, includes a cylindrical neck 42 that is inserted through the mounting passage 38 of the body 12, and is secured in place by the transversely inserted bayonet pin 46 and set bolt 48. It should be readily apparent to those of ordinary skill in the art that a mounting spigot 40 and clamp body 12 could be integrally formed as a one piece casting or forging 200, as shown in FIG. 10. The base 44 of the spigot 40 would thus be formed as an integral extension of the boss 92 of the base portion 18. However, for purposes of retrofitting existing clamps, which include mounting passages to accommodate conventional spigots, the spigot 40 of the preferred embodiment of the clamp 10 illustrated is formed separately from the clamp body 12. Thus the spigot 40 could be mounted within the body of a conventional clamp to provide a clamp with a quick release of lighting instruments and other equipment from the clamp. However, such a modified conventional clamp including the mounting spigot 40 of the present invention would not include the quick release clamping and unclamping advantages provided by the screw 26 and bolt 34 of the present invention.

The neck 42 of the mounting spigot 40 includes an internally threaded central passage 118. This is intended to allow the threadable connection of other structures to the distal end of the spigot 40 when removed from the clamp body 12, for connection to T-stems 58 of the present invention, thus providing further adaptability of the components of the clamp 10.

Referring still to FIG. 1, the base 44 of the spigot 40 has a generally cylindrical configuration. The base 44 and neck 42 are aligned upon a common longitudinal axis, which is aligned with longitudinal axis 94 of the mounting passage 38 when the spigot 40 is assembled to the clamp body 12. The T-slot 52 is formed radially into the base 44. The T-slot extends from the open first end 54 of the T-slot to the closed second end 56 within the interior of the base 44. Viewed in profile, the T-slot 54 has a wide upper portion and a downwardly opening narrower bottom portion. The width of the top portion of the T-slot 52 corresponds to the flat face-to-flat face diameter of the octagonal head 62 of the T-stem 58. The width of the narrow bottom portion of the T-slot 52 corresponds to the width of the stem 64 of the T-stem 58.

The T-slot 52 is configured in dimension such that when the T-stem is slid into the T-slot, the head 62 of the T-stem is closely received within the wide upper portion of the T-slot 52, with opposing flat faces of the octagonal head 62 contacting the interior sidewalls of the wide upper portion of the T-slot 52. This prevents rotation of the T-stem 58 within the T-slot 52. When fully inserted within the T-slot 52, the stem 64 of the T-stem 58 contacts the closed second end 56 of the narrow bottom portion of the T-slot 52, and in this position is longitudinally aligned with the mounting spigot 40 on the longitudinal axis 94. The T-stem 58 can be inserted and removed from the T-slot 52 only through the open first end 54 of the T-slot 52. Once inserted, inadvertent withdrawal is prevented by the spring loaded latch 66. The spring loaded latch 66 is biased to project downwardly into the interior of the T-slot 52, abutting against the radial and outermost flat face of the head 62 when it is fully inserted into the T-slot 52. In this position, the latch 66, which is illustrated and described in greater detail subsequently, physically blocks the head 62 so that it can not be withdrawn from the T-slot 52.

The proximal or bottom end of the base 44 of the spigot 40 is beveled about its outer periphery. The nut 68 that is threaded onto the stem 64 of the T-stem 58 includes an upwardly projecting collet flange 70 formed about its outer periphery. The interior surface of the collet flange 70 is correspondingly beveled to the bevel of the proximal bottom end of the base 44 of the spigot 40. After the T-stem 58 has been slid into the T-slot 52, the nut 68 can be threaded upwardly by pushing on the nut wings 82. As the nut 68 moves upwardly to receive the bottom proximal end of the base 44 of the spigot 40, the corresponding beveled surfaces of the base 44 and the collet flange 70 come into contact, causing automatic centering of the T-stem 58 relative to the spigot 40. Because the flange 70 receives and surrounds the bottom proximal portion of the base 44, it also acts to prevent withdrawal of the T-stem 58 from the T-slot 52. Withdrawal of the T-stem 58 can be readily affected, however, by backing the nut 68 downwardly until it no longer receives the base 44 of the spigot 40, and then lifting upwardly on the latch 66 to withdraw the latch 66 from the interior of the T-slot 52.

Figure 5:
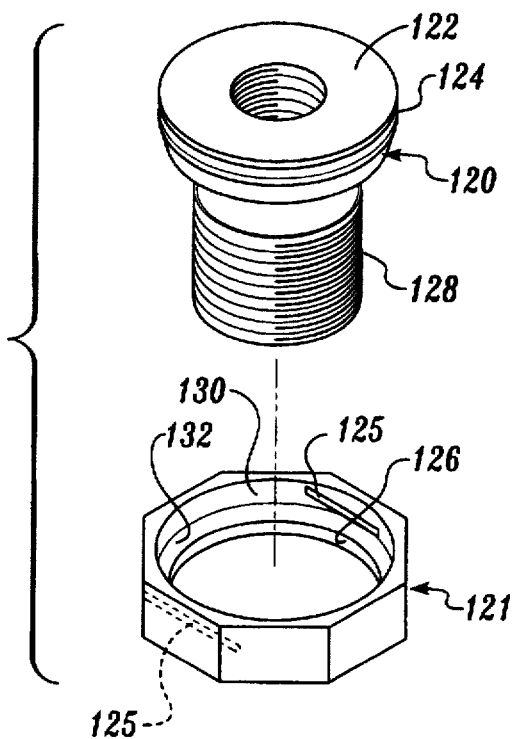
FIG. 5 is an isometric view of an alternate embodiment of a T-stem and ring for use with the clamp of the present invention.
Figure 6:
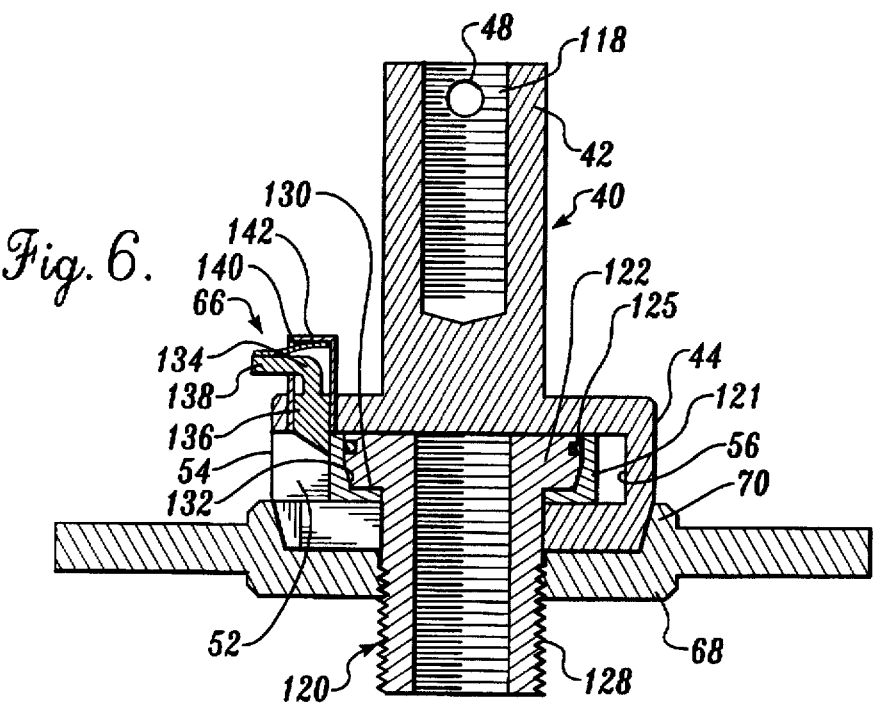
FIG. 6 a cross-sectional view of the T-stem and ring of FIG. 5 assembled to the spigot of the clamp of FIG. 1, taken along the longitudinal axis of the spigot and T-stem.

Attention is now directed to FIGS. 5 and 6 for description of an alternate configuration of the T-stem 58. Instead of providing a one piece T-stem 58 including a octagonal head 62, a round headed T-stem 120 and locking ring 121 assembly is provided. The round headed T-stem 120 is identical to the octagonal T-stem 58 previously described except for the following differences. The head 122 of the T-stem 120 has a circular circumference. An annular groove 124 is formed about the perimeter of the head 122. The annular groove 124 serves to retain the ring 121 on the head 122 of the T-stem 120 when the head 122 is not received in the T-slot 52 of the spigot 40. The ring 121 is provided with two spring wires 125, each inserted tangentially through the sidewall of the ring 121. The spring wires 125 are oriented such that the wires snap within the groove 124 upon pushing the head 122 into the recess 130. This serves to retain the ring 121 while still permitting the ring 121 to rotate on the T-stem 120, until compressed.

Below the groove 124, the perimeter of the head 122 is beveled. The annular ring 121 has an internal passage 126 which receives the stem 128 of the T-stem 120. The ring 121 includes an annular recess 130 defined in its upper surface that is dimensioned to correspond to the contour of the head 122. Thus a bottom inner wall portion 132 of the recess 130 is also beveled corresponding to the bevel of the head 122. However, the diameter of the beveled portion 132 is slightly less than the diameter of the beveled portion of the head 122, so that when the head 122 is received within the recess 130 of the ring 121 the corresponding beveled surfaces contact each other closely. Compression of the ring 121 and head 122 together causes these beveled surfaces to bind, such that when so compressed the T-stem 120 does not rotate relative to the ring 121. The interference fit of the beveled surfaces of the ring 121 and head 120 is very slight, and typically can be provided by manufacturing tolerances.

The exterior perimeter of the ring 121 is octagonally shaped, corresponding to the octagonal shape of the head 62 of the previously described T-stem 58. The ring 121 is placed on the stem 128 of the T-stem 120 between the head 122 and the nut 68. The head 122 of the T-stem 120 is received within the upward facing recess 130 of the ring 121, and the head 122 and ring 121 are slid as an assembly into the T-slot 52 of the spigot 40. When the nut 68 is threaded upwardly to receive the bottom proximal portion of the base 44 of the spigot 40, the T-stem 120 is drawn downwardly to compress the head 122 and the ring 121 together. Thus this compression antirotatably locks the ring 121 and head 122 together, and the octagonal outer surface of the ring 121 antirotatably secures this assembly against the sidewalls of the slot 52.

FIG. 6 further illustrates the spring loaded latch 66. The spring loaded latch 66 includes a dog legged latch 134 including a latch portion 136 and an actuating portion 138. The latch portion 136 projects downwardly through the base 44 of the spigot 40 into the T-slot 52. The actuating portion 138 projects radially outwardly from the upper end of the latch portion 136 for grasping to move the latch 134 in and out of the T-slot 52. A leaf spring 140 is compressed between the actuating portion 138 of the latch 134 and a housing 142 which surrounds the latch 134. The leaf spring 140, which could alternately be configured as a coil spring or other biasing device, serves to bias the latch 134 downwardly into the locked position within the T-slot 52. The actuating portion 138 of the latch 134 can be pressed upwardly to compress the spring 140 to remove the latch 134 from the T-slot 52.

It should be apparent that rather than a latch 66 as described, other types of safety latches could be employed.

Thus, a springloaded detent ball (not shown) could be mounted in the top of the T-slot 52 which would engage with a detent formed in the upper surface of the T-stem 58 or 120. Likewise, rather than including beveled mating surfaces on the ring 121 and T-stem 120 described above, other types of engaging surfaces could be employed. For example, the bottom lip of the head 122 of the T-stem 120 could be formed with a series of radial ratchet teeth (not shown) which would engage with an annular series of radial ratchet grooves (not shown) formed in the bottom of the recess 130 of the ring 121. Likewise, in place of ratchet teeth and grooves, a frictional gasket such as a leather gasket could be mounted between the head 122 of the T-stem 120 and the ring 121.

Figure 7:
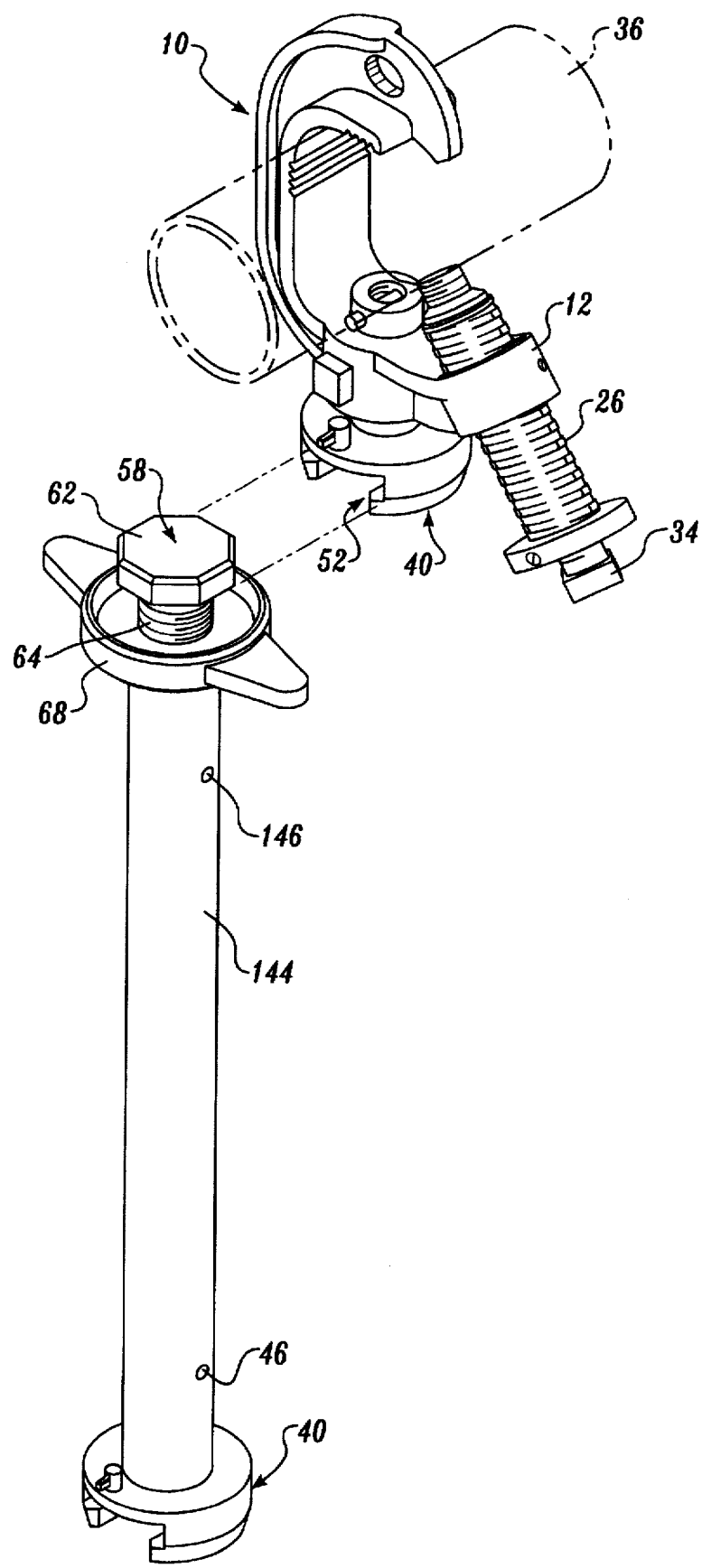
FIG. 7 is a pictorial view of the clamp of FIG. 1 mounted to a pipe shown in phantom and an isometric view of a T-stem and vertical extension rod.

FIG. 7 illustrates the clamp 10 and T-stem 58 of the present invention adapted for use with an extension rod 144. The clamp 10 is configured the same as previously described, as are the T-stem 58 and nut 68. The stem 64 of the T-stem 58 (configured as a longer bolt with an octagonal head 62, as illustrated) is threaded into one end of a tubular extension rod 144. A radially oriented set screw 146 is threaded in to bear against the stem 64 to prevent them from becoming inadvertently unthreaded. The nut 68 is positioned on the stem 64 between the head 62 and the extension rod 144. The T-stem 58 engages with the T-slot 52 of the spigot 40 exactly as previously described to mount the clamp 10 on the end of the extension rod. The opposite end of the extension rod 144 can be provided with a second spigot 40, configured exactly as the previously described spigot 40 of the clamp 10. The bayonet pin 46 is inserted transversely through the tubular extension rod 144 to capture and secure the upper end of the neck 42 of the spigot 40. By unthreading the set screw 146 and removing the bayonet pin 46, the T-stem 58 and the spigot 40 may be easily removed from the extension rod 144. The T-stem 58 and spigot 40 can then be placed on other tubular extension rods, or other tubular members that have a greater or shorter length than the extension rod 144.

FIGS. 8 and 9 illustrate alternate uses of an extension rod 144 provided on one end with a spigot 40 of the present invention and on the other end with a T-stem 58 and nut 68 of the present invention, as previously described in FIG. 7. However, rather than mounting the T-stem 58 to a clamp 10 of the present invention, the T-stem is mounted to a length of structural track 148 (only a portion of which is illustrated). Conventional track used in theatrical lighting has a generally square tubular outer profile. The track 148 has three longitudinal, solid-walled sides 150. The fourth longitudinal wall of the track 148 includes a longitudinal slot 152. The head 62 of the T-stem 58 can be inserted endwise into the track 148 (as shown in FIG. 8), with the stem 64 of the T-stem 58 being received within the slot 152 of the track 148. The nut 68 is then turned to bear against this open longitudinal side of the track 148 to clamp the edges of the slot 152 between the head 62 of the T-stem 58 and the nut 68. A conventional type of structural track suitable for use with the T-stem 58 of the present invention is the Unistrut™ Model 1000 track.

FIGS. 8 and 9 include a modification to conventional track. A spaced series of elongate engagement slots 154 (only one being illustrated) is formed along the length of the track 148 in the solid longitudinal side 150 opposite the longitudinal slot 152. Each engagement slot 154 includes a wide end 156 which has a width corresponding to the width of the head 62 of the T-stem 58, and a narrow end 158, corresponding in width to the stem 64. As shown in FIG. 9, the extension rod 144 can be mounted to this longitudinal side 150 of the track 148, opposite of the slot 152, by inserting the head 62 of the T-stem 58 into the wide end 156 of the engagement slot 154. The head is then slid longitudinally until the stem 64 is received within the narrow end 158 of the engagement slot 154, and the nut 68 is tightened down to securely join the extension rod 144 to the track 148.

While the preferred embodiment of the invention has been illustrated and described, it will be appreciated that various changes can be made therein without departing from the spirit and scope of the invention. It is therefor intended that the scope of letters patent granted hereon be limited only by the definitions contained in the appended claims.

The embodiments of the invention in which an exclusive property or privilege is claimed are defined as follows:

1. A quick release clamp for mounting equipment on a structural member, comprising:

- a C-shaped body having a jaw portion, a back portion, and a base portion, the jaw and base portions extending from the back portion in opposing spaced disposition, the base portion defining an adjustment aperture, wherein the adjustment aperture is formed with an internal interrupted thread;

- an elongate tubular sleeve defining an internal uninterrupted threaded passage and an external interrupted thread, the sleeve being receivable within the adjustment aperture of the body and rotatable about a longitudinal axis of the sleeve between a first position, in which the sleeve is freely movable longitudinally within the adjustment aperture, and a second position, in which the external interrupted thread of the sleeve engages and locks within the internal interrupted thread of the body to prevent longitudinal movement of the sleeve;

- an elongate bolt coaxially and threadably received within the sleeve and rotatable within the sleeve to project a selected amount through the sleeve towards the jaw and back portions of the body to securely capture the structural member therebetween; and

- mounting means formed on the body for securing the body to the equipment.

2. The clamp of claim 1, wherein the external interrupted thread of the sleeve defines a square external profile and the internal interrupted thread of the body defines a square internal profile when viewed endwise along the longitudinal axis of the sleeve.

3. The clamp of claim 2, wherein the internal interrupted thread of the body and the external interrupted thread of the sleeve are spirally formed.

4. The clamp of claim 3, wherein the internal interrupted thread of the body and external interrupted thread of the sleeve are formed with a left-handed spiral.

5. The clamp of claim 4, further comprising a stop formed on the major diameter of the internal interrupted thread of the body to limit the complete rotation of the tubular sleeve relative to the body for locking of the sleeve within the adjustment aperture when the sleeve is rotated to the second position.

6. The clamp of claim 1, wherein the body further defines a carabiner/safety cable aperture formed tranversely through one of the jaw and back portions of the body.

7. The clamp of claim 1, wherein the mounting means comprises a mounting passage capable of receiving a mounting spigot that is selectively securable to the equipment.

8. The clamp of claim 7, wherein the mounting means further comprises a mounting spigot including an elongate neck and a base, the neck being insertable through the mounting passage of the body, and securement means for securing the neck of the mounting spigot within the mounting passage of the body, wherein the base of the mounting spigot defines an elongate slot having a T-shaped cross-sectional profile, an open first end and a closed second end.

9. The clamp of claim 8, further comprising means for preventing rotation of the spigot relative to the body.

10. The clamp of claim 8, further comprising a stop that is mounted within the spigot and that is biased to project inwardly into the slot to block the open end of the slot and that is selectively withdrawable from the slot.

11. The clamp of claim 8, further comprising a T-stem having an elongate stem securable to the equipment and a T-shaped head slidably insertable into the slot of the spigot through only the open first end of the slot.

12. The clamp of claim 11, wherein the stem of the T-stem is externally threaded, further comprising a nut threadably engaged on the exterior of the stem and threadably advanceable on the stem toward the spigot when the head of the T-stem has been inserted into the slot of the spigot until the nut contacts the spigot to prevent removal of the head from the slot.

13. The clamp of claim 12, wherein the nut engages the base of the mounting spigot so as to center the T-stem relative to the mounting spigot.

14. The clamp of claim 13, wherein the nut includes an annular lip that receives the base of the mounting spigot when the nut has been tightened against the mounting spigot.

15. The clamp of claim 11, further comprising means for preventing rotation of the T-stem relative to the mounting spigot.

16. The clamp of claim 15, wherein the means for preventing rotation comprises first and second flat sides formed on the head of the T-stem that contact corresponding internal surfaces of the slot of the mounting spigot when the head of the T-stem is inserted into the slot.

17. The clamp of claim 15, wherein the means for preventing rotation comprises an annular ring, the ring being receivable on the stem of the T-stem between the head of the T-stem and the nut, the head of the T-stem and the ring forming corresponding engaging surfaces such that when the head is compressed against the ring, the head is prevented from rotating relative to the ring, wherein the ring has first and second flat sides that contact corresponding internal surfaces of the slot of the mounting spigot when the ring is inserted with the head into the slot of the mounting spigot.

18. The clamp of claim 17, wherein the engaging surfaces of the ring and head of the T-stem comprise mating annular beveled surfaces.

19. The clamp of claim 1, wherein the mounting means comprises a boss provided on the body and adapted to include a base defining an elongate slot having a T-shaped cross-sectional profile, an open first end and a closed second end.

20. The clamp of claim 19, further comprising a T-stem having an elongate stem securable to the equipment and a T-shaped head slidably insertable into the slot of the base through only the open first end of the slot.

21. The clamp of claim 20, wherein the stem of the T-stem is externally threaded, further comprising a nut threadably engaged on the exterior of the stem and threadably advanceable on the stem toward the base when the head of the T-stem has been inserted into the slot of the base until the nut contacts the base to prevent removal of the head from the slot.

22. The clamp of claim 21, wherein the nut engages the base so as to center the T-stem relative to the base.

23. The clamp of claim 22, wherein the nut includes an annular lip that receives the boss when the nut has been tightened against the base.

24. The clamp of claim 19, further comprising means for preventing rotation of the T-stem relative to the base.

25. The clamp of claim 24, wherein the means for preventing rotation comprises first and second flat sides formed on the head of the T-stem that contact corresponding internal surfaces of the slot when the head of the T-stem is inserted into the slot of the base.

26. The clamp of claim 24, wherein the means for preventing rotation comprises an annular ring, the ring being receivable on the stem of the T-stem between the head of the T-stem and the nut, the head of the T-stem and the ring forming corresponding engaging surfaces such that when the head is compressed against the ring, the head is prevented from rotating relative to the ring, wherein the ring has first and second flat sides that contact corresponding internal surfaces of the slot of the base when the ring is inserted with the head into the slot of the base.

27. The clamp of claim 26, wherein the engaging surfaces of the ring and head of the T-stem are selected from the group consisting of mating annular beveled surfaces and mating annular ratchet surfaces.

28. A quick release clamp for mounting equipment on a structural member, comprising:
- a C-shaped body having a jaw portion, a back portion, and a base portion, the jaw and base portion extending from the back portion in spaced opposing disposition, the base portion defining in adjustment aperture, wherein the adjustment aperture is formed with an internal engagement surface;
- an elongate tubular sleeve defining an internal threaded passage and an external engagement surface, the sleeve being receivable within the adjustment aperture of the body and positionable between a first position, in which the sleeve is freely movable longitudinally within the adjustment aperture, and a second position, in which the external engagement surface of the sleeve engages and locks against the internal engagement surface of the body to prevent longitudinal movement of the sleeve;
- an elongate bolt coaxially and threadably received within the sleeve and rotatable within the sleeve to project a selected amount through the sleeve towards the jaw and back portions of the body to securely capture the structural member therebetween; and
- a mount formed on the body for securing the body to the equipment.

29. A clamp assembly for mounting equipment on a structural member, comprising:
- a C-shaped body having a jaw portion, a back portion and a base portion, the jaw and base portions extending from the back portion in spaced opposing disposition, the base portion defining an internally threaded aperture;
- an elongate bolt threadably received within the aperture and rotatable to project a selected amount towards the jaw and back portions of the body to securely capture the structural member therebetween;
- a boss provided on the body, the boss including a base defining an elongate slot having a T-shaped cross-sectional profile, an open first end and a closed second end;
- a T-stem having an elongate stem securable to the equipment and a T-shaped head slidably insertable into the slot of the base through only the open first end of the slot; and means for selectively securing the head of the T-stem to prevent withdrawal of the head from the slot.

30. The clamp assembly of claim 29, wherein the means for selectively securing comprises a nut that is threadable onto the stem of the T-stem and that can be threadably advanced to receive the base when the head of the T-stem is inserted into the slot of the base.

31. The clamp assembly of claim 29, wherein the means for selectively retaining further comprises a stop mounted within the base and biased to project inwardly into the slot to prevent withdrawal of the head of the T-stem from the slot and being selectively withdrawable from the slot to enable withdrawal of the head of the T-stem from the slot.

32. A clamp assembly for mounting equipment on a structural member, comprising:

a C-shaped body having a jaw portion, a back portion and a base portion, the jaw and base portion extending from the back portion in spaced opposing disposition, the base portion defining an internally threaded aperture;

an elongate bolt threadably received within the aperture and rotatable to extend a selected amount towards the jaw and back portions of the body to securely capture the structural member therebetween; sand a boss provided on the body, the boss including a base defining an elongate slot having a T-shaped cross-sectional profile, an open first end and a closed second end.

* * * * *

UNITED STATES PATENT AND TRADEMARK OFFICE
CERTIFICATE OF CORRECTION

PATENT NO. : 5,775,652
DATED : July 7, 1998
INVENTOR(S) : A.W. Crawshaw et al.

It is certified that error appears in the above-identified patent and that said Letters Patent is hereby corrected as shown below:

| COLUMN | LINE | |
|---|---|---|
| [56]<br>Pg. 1, col. 1 | Refs. Cited<br>(U.S.Pats.,<br>Item 1) | "1,745,929" should read --1,754,929-- |
| [56]<br>Pg. 1, col. 1 | Refs. Cited<br>(Other Publs.,<br>Item 3) | "Manjfacturing" should read --Manufacturing-- |
| 14<br>(Claim 28, | 29<br>line 6) | "in adjustment" should read --an adjustment-- |
| 16<br>(Claim 32, | 9<br>line 11) | "sand" should read --and-- |

Signed and Sealed this

First Day of December, 1998

Attest:

BRUCE LEHMAN

*Attesting Officer*  *Commissioner of Patents and Trademarks*